US008504486B1

(12) United States Patent
Pinto

(10) Patent No.: US 8,504,486 B1
(45) Date of Patent: Aug. 6, 2013

(54) COLLECTION AND PROVISION OF LONG-TERM CUSTOMER REVIEWS

(75) Inventor: Elton Victor Pinto, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 304 days.

(21) Appl. No.: 12/884,326

(22) Filed: Sep. 17, 2010

(51) Int. Cl.
G06Q 30/02 (2012.01)
G06Q 10/06 (2012.01)
G06Q 30/06 (2012.01)
G06Q 10/10 (2012.01)
G06Q 10/08 (2012.01)

(52) U.S. Cl.
USPC .......................................... 705/347; 705/1.1

(58) Field of Classification Search
None
See application file for complete search history.

(56) References Cited

U.S. PATENT DOCUMENTS 6,963,848 B1 11/2005 Brinkerhoff
2011/0087737 A1* 4/2011 Smith ........................... 709/205

OTHER PUBLICATIONS

Amazon.com: Customer Review: Playstation 3 120 GB, http://www.amazon.com/PlayStation-3-120-GB/product-reviews/B00210J4VQ/ref+dp_top. . . , Jun. 29, 2010 (Admitted Prior Art).
Amazon.com Help: Badges, http://www.amazon.com/gp/help/customer/display,html/ref-cm_rn_bdg_help?ie=UTF8&n. . . , Jun. 29, 2010 (Admitted Prior Art).
Customer Review of Toshiba Laptop, http://www.newegg.com/Product/ProductReview.aspx?Item=N82E16834114791, Jun. 29, 2010 (Admitted Prior Art).

* cited by examiner

Primary Examiner — Jonathan Ouellette
(74) Attorney, Agent, or Firm — Thomas|Horstemeyer, LLP

(57) ABSTRACT

Methods, systems and computer program products are disclosed for collecting and providing long-term reviews for items such as products and services. In an exemplary method, a first review for an item may be received from a reviewer over a communications network. A determination may be made as to when the reviewer will be a long-term reviewer for the item. After the reviewer is a long-term reviewer for the item, a second review for the item may be requested, and such a second review for the item may be received from the reviewer in response to this request. A request to view reviews for the item may also be received, and both the first and second reviews may be provided in response to this request.

27 Claims, 14 Drawing Sheets

CUSTOMER REVIEWS

PRODUCT XYZ

136 REVIEWS

5 STAR (63)
4 STAR (47)
3 STAR (11)
2 STAR (4)
1 STAR (11)

AVERAGE CUSTOMER REVIEW

★★★★☆ 406

SEARCH CUSTOMER REVIEWS

[          ] 410

☐ ONLY SEARCH THIS PRODUCT'S REVIEWS (CREATE YOUR OWN REVIEW) 408

MOST HELPFUL FAVORABLE REVIEW

★★★★★
On balance, I found Product XYZ to be a tremendous value for the money.....
412

MOST HELPFUL CRITICAL REVIEW

★★★★☆
I found Product XYZ to be a tremendous disappointment. The instructions were very difficult to follow, and it took over 6 hours to properly configure the product. I was also disappointed in that......
414

SEE MORE 5 STAR, 4 STAR REVIEWS 416

SEE MORE 3 STAR, 2 STAR, 1 STAR REVIEWS 416

< PREVIOUS | 1 | 2 .... 58 | NEXT >

Most Helpful First | Newest First 420

★★★★☆ Product XYZ Reloaded, August 25, 2009 – Verified Purchase (What's this?)
By Jammaster (Athens, GA) – See all my reviews 418
On balance, I found Product XYZ to be a tremendous value for the money..... 422

COLLECTION AND PROVISION OF LONG-TERM CUSTOMER REVIEWS

BACKGROUND

Online buying, leasing and selling of products and services over computer networks have continued to proliferate with widespread Internet usage. In many cases, Internet web sites that facilitate these Internet sales transactions provide access to customer reviews (which are also referred to herein simply as "reviews") that were submitted by prior purchasers of the products or services. The availability of these reviews may increase prospective purchasers confidence in purchasing a product or service, and hence may facilitate increasing Internet sales. The provision of both positive and negative reviews may also enhance a retailer's image for fairness and openness which may increase consumer confidence in the retailer. In addition, the reviews may be used by merchants, distributors and manufacturers to improve their products and/or services. For example, if consumers indicate via the reviews that they are particularly unhappy with the lack of certain product features or the overall product performance, manufacturers can modify their products to include the desired features or to improve the overall product performance.

In order to encourage purchasers to provide reviews, reminders may be sent out via, for example, e-mail to purchasers which request that the purchaser provide a review of the purchased product or service. Typically, these reminders are sent to the purchaser shortly after the purchase and/or the expected delivery date of the purchased product (e.g., within a month or two). Reviews that are submitted in response to these e-mail reminders as well as reviews which are submitted sua sponte by purchasers are then made available on the retailer's web site. The retailer's web site may also provide information that summarizes certain of the information provided in the reviews such as, for example, average overall customer ratings for a product or service and/or average customer ratings for certain specific product or service features, attributes, and the like (e.g., value, ease of use, reliability, etc.). It is desirable that the reviews obtained for each product or service generally reflect an aggregate opinion of customers who purchased the item so that the online retailer may identify products that have not been received favorably for possible discontinuation and so that manufacturers may receive feedback regarding problems or possible improvements for their products. Moreover, the availability of the reviews may attract consumers to the merchant site, resulting in increased sales. In addition, because the reviews may better inform consumers regarding the items that they are interested in prior to purchase, they are more likely to be satisfied with their purchases, thus reducing the number of expensive returns. For newly released items, the reviews may also be used by the merchant to forecast sales volumes and associated inventory needs.

BRIEF DESCRIPTION OF THE DRAWINGS

FIG. 4A is a schematic diagram illustrating a conventional user interface that may be used to access reviews for an item.

DETAILED DESCRIPTION

Figure 1:
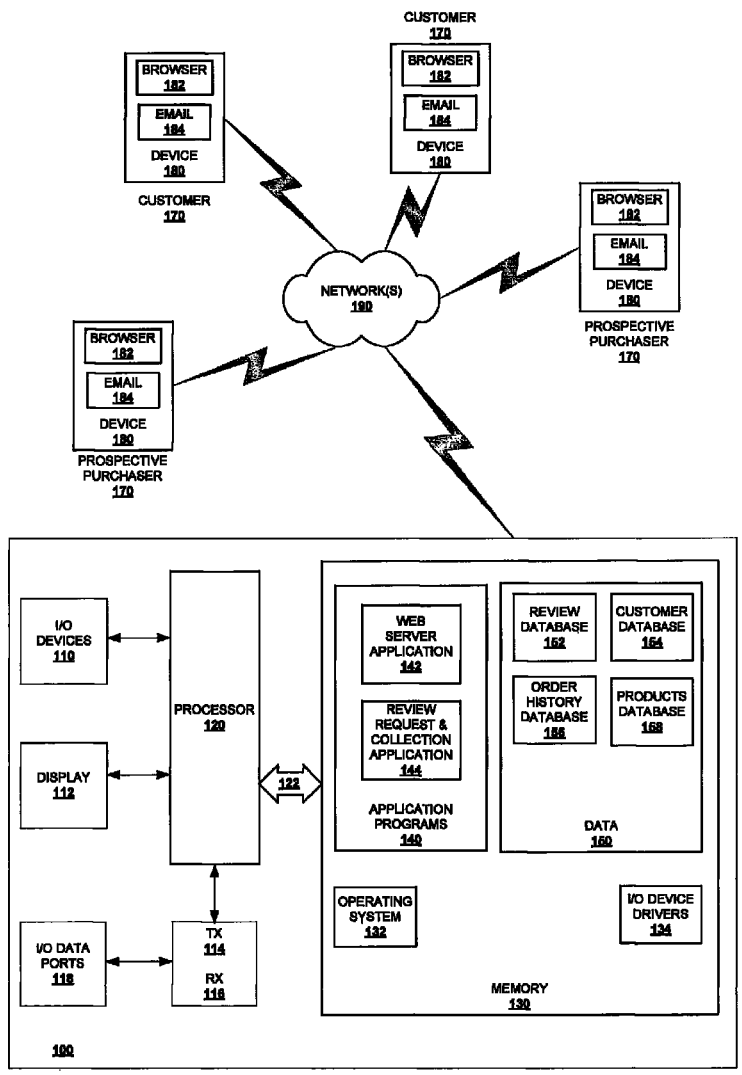
FIG. 1 is a block diagram of systems, devices, methods and computer program products for collecting and/or providing reviews for an item according to embodiments of the present disclosure.

Methods, systems and computer program products are disclosed herein which may be used to provide reviews to prospective purchasers in a fashion that better shows how prior purchaser's opinions regarding a product or service have changed over time. This may be accomplished by, for example, differentiating between short-term and long-term reviews, particularly for durable products and long-term services. In order to provide improved information regarding how prior purchasers' opinions regarding items have changed over time, these methods, systems and computer program products may be designed to encourage individuals who submitted short-term reviews to later submit a long-term review that shows how their opinions have changed (if any) after more extended use of the item at issue.

Herein, a short-term review refers to a review of an item that was submitted shortly after the item was purchased, and hence before the reviewer has owned/used the item for an extended period of time. These short-term reviews can provide valuable information to both prospective purchasers and the party offering the product or service at issue (e.g., an online retailer), and may quickly generate a snapshot of user feedback for new products. A long-term review, on the other hand, refers to a review that is submitted by the reviewer after the item has been owned or used for a pre-specified, more extended period of time.

For many types of products and services, a purchaser's initial opinions regarding the purchased item tend to hold true in the long-term (i.e., for books, music, DVDs, online movie rentals, etc.). However, for other items such as durable products (e.g., electronics, houseware items, tools and various other products) and long-term or "durable" services (e.g., anti-virus software), purchasers' opinions regarding the purchased item are more likely to be subject to change over time, sometimes in dramatic fashion. As a result, the short-term reviews for some products and services may differ significantly from reviews that were submitted after more extensive use of the item, which may make it difficult for merchants, manufacturers and/or prospective purchasers to use reviews to obtain a well-rounded picture of overall consumer satisfaction with a product or service. For example, a prospective purchaser may need to manually sift through a large number of short-term reviews in order to find a relatively smaller number of long-term reviews in order to obtain an accurate picture of the overall satisfaction level with a particular item and how that satisfaction level varied with time. In fact, most conventional long-term reviews consist of additional text that a reviewer adds at a later date by editing a previously submitted short-term review. As such reviews contain both short-term and long-term feedback that are intermixed in the text of the same review, a reviewer seeking long-term feedback may have to first identify the relatively few reviews that contain long-term comments, and then parse the text of those reviews to find the later-added comments regarding the reviewers' long-term satisfaction. Such difficulties in obtaining feedback regarding prior purchasers' long-term satisfaction with an item may cause some prospective purchasers to forego purchasing the item at issue, particularly for durable products and services, as the opinions regarding these items are more likely to change over time.

In some embodiments of the methods, systems and computer program products that are disclosed herein, the short-term and long-term reviews that are provided by a particular reviewer may be disseminated such that they are simultaneously displayed to a prospective purchaser or other person who requests the reviews for an item. For example, the short-term and long-term reviews may be displayed adjacent to each other. This may make it easy for prospective purchasers to see how the opinions of prior purchasers regarding the item have changed over time, and may also allow them to gauge the usefulness of short-term reviews that do not have a corresponding long-term review. In some embodiments, each review may include indicia specifying the length of time that the reviewer used the product or service prior to submitting the review.

In some embodiments, prospective purchasers or other persons accessing the reviews for an item may be given the option of sorting the reviews based on the length of time that the reviewer used the item prior to submitting the review. Thus, for example, the prospective purchaser could sort the reviews to view only reviews submitted by purchasers who had used the item for at least a year. This may allow purchasers to quickly and easily identify the types of problems and/or concerns that may arise with the product or service over time. In some embodiments, reviewers may be given different options when posting a second or later review for an item depending upon the type of item at issue. For example, for durable products services, the reviewer may be given the option of providing a second review that is distinct from their initial review that includes, for example, a revised rating and/or information regarding how and/or why their opinion of the item has changed over time. In contrast, for non-durable items, the reviewer may only be allowed to modify their original review when submitting a second or later review.

In further embodiments, methods, systems and computer program products are provided which can be used to summarize a collection of reviews that includes both short-term and long-term reviews. In one such method, each review may be categorized based on the length of time the respective reviewers had used the item at the time the review was received (e.g., each review may be categorized as either a short-term review or a long-term review). An average rating for the item may then be calculated based on these reviews, where the reviews in a first category are weighted differently than the reviews in a second category in calculating the average rating. By way of example, if one hundred reviews have been provided for a durable product, only ten of which are long-term reviews, the long-term reviews may be weighted more heavily in calculating the average rating. Information may also be provided to prospective purchasers that graphically depicts how an average rating varies as a function of the length of time that the reviewer had owned or used the item at issue at the time that the rating was submitted.

Certain embodiments of the above-summarized methods, systems and computer program products will now be described with reference to the drawings.

FIG. 1 is a block diagram illustrating the basic hardware and software components of systems (which may at least in part be implemented as computer program products) 100 for collecting and disseminating reviews that may be used to carry out various of the methods disclosed herein. These systems 100 collect reviews from individuals who have used an item such as a product or a service and then disseminate these reviews to other individuals such as prospective purchasers. In some embodiments, the system 100 may include a commercial web site that includes functionality for allowing users to browse and make online purchases from a catalog of products and/or services. The items available for purchase from the web site may, for example, include items available for rent and downloadable items such as software programs and digital publications. The web site may include a review database that stores reviews and information (product codes, order dates, shipping dates, review incentive-types, review incentive periods, etc.) about when requests should be sent to customers.

Herein the term "item" refers to a product or a service or to any combination of products and services or bundled products and services. The term "review" is used herein to refer to comments, feedback and/or ratings regarding an item that are provided by a user of the item. As noted above, reviews may be categorized temporally. Herein the term "long-term review" refers to a review that was submitted by a reviewer after the reviewer had owned or used the item (or is estimated to have used the item) for at least a predetermined amount of time, where the predetermined amount of time may vary depending upon the item at issue. A "long-term reviewer" consequently refers to a reviewer that has used (or, alternatively, owned) an item for a sufficient amount of time to submit a long-term review. A "short-term review" refers to a review that does not qualify as a long-term review. It should be noted that in some embodiments there may be multiple categories of long-term reviews (e.g., reviews submitted after 6 months of use but before 1 year of use, reviews submitted after 1 year of use, but less than 2 years of use, etc.). Herein the term "purchase" and variants thereof refer to any item that is bought, leased, rented, downloaded, subscribed to or the like.

Herein the term "durable items" refer to (1) products that do not quickly wear out and have an expected lifespan of at least one year (such products are referred to as "durable products" herein) and (2) services that last for at least one year (such services are referred to as "durable services" herein). Examples of durable products include appliances, electronic equipment, business equipment, home furnishings, housewares, photographic equipment, recreational goods, toys and games, among others. Non-durable products, on the other hand, refer to products that are used up after their first use or which have an expected lifespan of less than a year such as, for example, cosmetics, cleaning products, foods, fuel, office supplies, packaging and containers, paper and paper products, personal products, clothing, footwear, plastics, textiles, DVDs, music, and the like. An example of a durable service is a computer anti-virus service with a subscription of at least one year.

Herein, the term "web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a web or other network site can, for example, include multiple geographically-distributed computer systems that are appropriately linked together. Furthermore, while the following description relates to an embodiment utilizing the Internet and related protocols, other networks and protocols may be used as well.

Referring again to FIG. 1, a plurality of customers, prospective purchasers and other individuals 170 may have devices 180 that are connected to the system 100 over one or more communications networks 190. The network(s) 190 may be any public and/or private, virtual and/or real, wired and/or wireless network or combination of networks, specifically including the Internet. Each of the devices 180 may be embodied as one or more enterprise, application, personal, pervasive and/or embedded computers that may be used to access web sites or other types of network sites such as, for example, desktop, notebook, netbook, and/or laptop computers, smartphones, electronic book readers, game consoles, Internet enabled televisions, music playback devices, tablets and/or any other embedded device. The devices 180 may run commercially available Web-browser applications 182 such as Microsoft Internet Explorer® or Google Chrome® which implement the basic World Wide Web standards such as HTTP and HTML, or may be any other application that may be used to access or receive information from the system 100.

The devices 180 may also run an e-mail application 184 such as, for example, Microsoft Outlook® or any other e-mail application which may be used, for example, to receive e-mail messages from the system 100. The e-mail application 184 may be used to receive requests for reviews and to send reviews in response to these requests (in some embodiments the reviews may be input using the Web-browser application 182 instead). The e-mail application 184 and the browser 182 on each device 180 may or may not be integrated with one another, and/or may be integrated with other application programs and/or the operating system on the device 180. It will also be appreciated that the devices 180 may alternatively or additionally run other communication applications such as, for example, a short messaging service ("SMS") application, an instant messaging ("IM") application, a texting application or the like that may be used to receive requests for reviews and/or to send reviews in response to these requests. Thus, while the description below primarily uses the e-mail application 184 as an example of an application running on device 180 that may be used to receive requests for reviews and/or to send reviews in response to these requests, it will be appreciated that a wide variety of other communication techniques may be used instead.

As is further shown in FIG. 1, the system 100 may include one or more input devices 110 (e.g., a keyboard) and a display 112 that may be used to control, operate, modify and test the system 100. The system 100 further includes a transmitter 114 and a receiver 116 that may be used to transmit information over the network(s) 190 via one or more input/output data ports 118 and to receive information over the network(s) 190 via the input/output data ports 118. The transmitter 114 may be used to transmit requests for reviews to various of the individuals 170 (e.g., to prior customers) over the network(s) 190 and to transmit web pages including product information, reviews and the like to individuals 170 (e.g., to prospective purchasers). The receiver 116 may be used to receive reviews from various of the individuals 170 (e.g., prior customers) over the network(s) 190 and to receive requests from the individuals 170 (e.g., from prospective purchasers) to view web pages including product information, reviews and the like.

A processor 120 may be connected to the various the components of the system 100 through, for example, a bus or direct connections. The processor 120 may comprise one or more enterprise, application, personal, pervasive and/or embedded computer systems that may be standalone and/or connected by a wired and/or wireless, real and/or virtual, public and/or private network including the Internet. In some embodiments, the processor may be a server or a plurality of servers. The processor 120 may be used to run the operating system 132 and application programs 140 associated with system 100. As will be discussed in greater detail below, operations performed by the processor 120 when running these application programs 140 may include, for example, determining when requests for reviews should be sent to customers (including both requests for short-term and long-term reviews), sending such requests for reviews to customers, determining when a particular review qualifies as a long-term reviewer, determining associations amongst the reviews that are received (e.g., determining that a long-term review for an item has a corresponding short-term review that was submitted by the same reviewer), calculating various average ratings for the reviews of each item, performing various sorts of the reviews that may be requested by the individuals 170, determining what types of reviews should be requested for each item (e.g., requesting long-term reviews for items that are identified as durable products), configuring web pages that are transmitted to the individuals 170 to display associated reviews together (e.g., side-by-side), etc.

The system 100 further includes a memory 130 that stores various data and programs that may be used to operate system 100. A bus 122 may connect the processor 120 to the memory system 130. The memory system 130 may comprise one or more memory devices. The memory device(s) that comprise memory system 130 may include solid state memory devices (such as static, dynamic, volatile and/or non-volatile solid state memory devices) and/or movable memories (such as rotatable magnetic and/or optical memory devices in the form of discs and/or tapes). These memory devices may be arranged in a hierarchy of devices and may be standalone and/or connected by a wired and/or wireless, real and/or virtual, public and/or private network including the Internet. As shown in FIG. 1, the operating system 132, input/output device drivers 134, application programs 140 and various data 150 may be stored in memory 130.

The data 150 may include a review database 152, a customer database 154, an order history database 156 and a products database 158. The review database 152 may include the reviews that have been submitted by prior purchasers and/or users for various items. The review database 152 may include a plurality of fields that include information such as a title for the review, the text of each review that is submitted, identification of the item the reviewed, identification of the submitter of the review, the location of the submitter, any rankings provided in the review, information as to whether the submitter is a verified purchaser, the date the review was submitted, information on the actual or estimated length of time the submitter had owned and/or used the item at the time the review was submitted, etc.

The customer database 154 may include information regarding the various customers of the system 100 including identification and address information, payment information, credit card information, purchase histories and the like. The order history database 156 may include information such as product codes, order dates, shipping dates, returns, etc. The products database 158 may include information on all of the products and services that are available for purchase through the system 100, and may include, for example, HTML web pages that may be sent to the individuals 170 to allow those individuals to, among other things, view the product/service offerings, access detailed information on each such product or service, purchase such products and services, and submit reviews thereon.

The application programs 140 may include a web server application 142 and a review request and collection application 144. The web server application 142 may access the products database 158 to generate web pages in response to actions of the individuals 170 who "access" the system 100 (i.e., who visit a web site generated by system 100). These web pages may be used to provide various information to the individuals 170 such as product listings and descriptions, technical specifications, review and rating information, terms of purchase and various other information that is commonly provided to online purchasers and prospective purchasers. The web pages generated by the web server application 142 may also be used to accept purchases from the individuals 170. The web pages generated by the web server application 142 may also include customer reviews and allow the individuals 170 to navigate the reviews that are available for each item offered for sale via the system 100.

The applications 140 further include a review request and collection application 144 which may include the basic functionality for tracking when review requests should be provided to a customer and for offering incentives to customers to provide reviews under certain circumstances. The review request and collection application 144 may access the review database 152 and the order history database 156 to determine what reviews each purchaser has previously submitted for the item (if any), the timing for sending any requests for reviews, any incentives that should be offered for providing reviews and the like.

While the web server application 142 and the review request and collection application 144 are depicted in FIG. 1 as being embodied by computer-readable program code, it will be appreciated that in other embodiments, the web server application 142 and/or the review request and collection application 144 may be embodied at least in part by special purpose hardware including application-specific integrated circuits.

While FIG. 1 depicts the system 100 as being located in a single location, it will be appreciated that the hardware and/or software components of system 100 may alternatively be distributed across multiple devices which may be located in multiple locations. For example, the processor 120 may comprise a plurality of servers, each of which may run one or more of the application programs 140. The memory system 130 may comprise a plurality of networked memory storage devices which are used to store the application programs 140 and the various databases 150. The servers and memory storage devices may be stored in a single location or distributed across multiple locations. Thus, it will be appreciated that the system 100 may be embodied by one or more enterprise, application, personal, pervasive and/or embedded computer systems that may be standalone and/or interconnected by a public and/or private, wired and/or wireless, real and/or virtual network including the Internet. It will be appreciated that the block diagram of FIG. 1 schematically illustrates one simplified exemplary embodiment, and that the system of FIG. 1 may be modified in numerous ways and need only include elements that are capable of carrying out the functionality of one or more of the various methods described herein.

Herein, references are made to "using a computer" to perform various operations. It will be appreciated that these references refer to using any type of electronic processing element such as, for example, the processor 120 of FIG. 1. The electronic processing element may comprise, for example, a microprocessor of a server, a general purpose computer or special purpose computer, a microcontroller, a digital signal processor, firmware, or any other computer processing device.

Operations by which an online retailer or other entity can collect reviews for an item according to certain embodiments of the present disclosure will now be described with reference to the flow chart of FIG. 2. While the operations of FIG. 2 are described with respect to a review collection system run by an online retailer, it will be appreciated that the operations could be carried out by other review collection entities.

Figure 2:
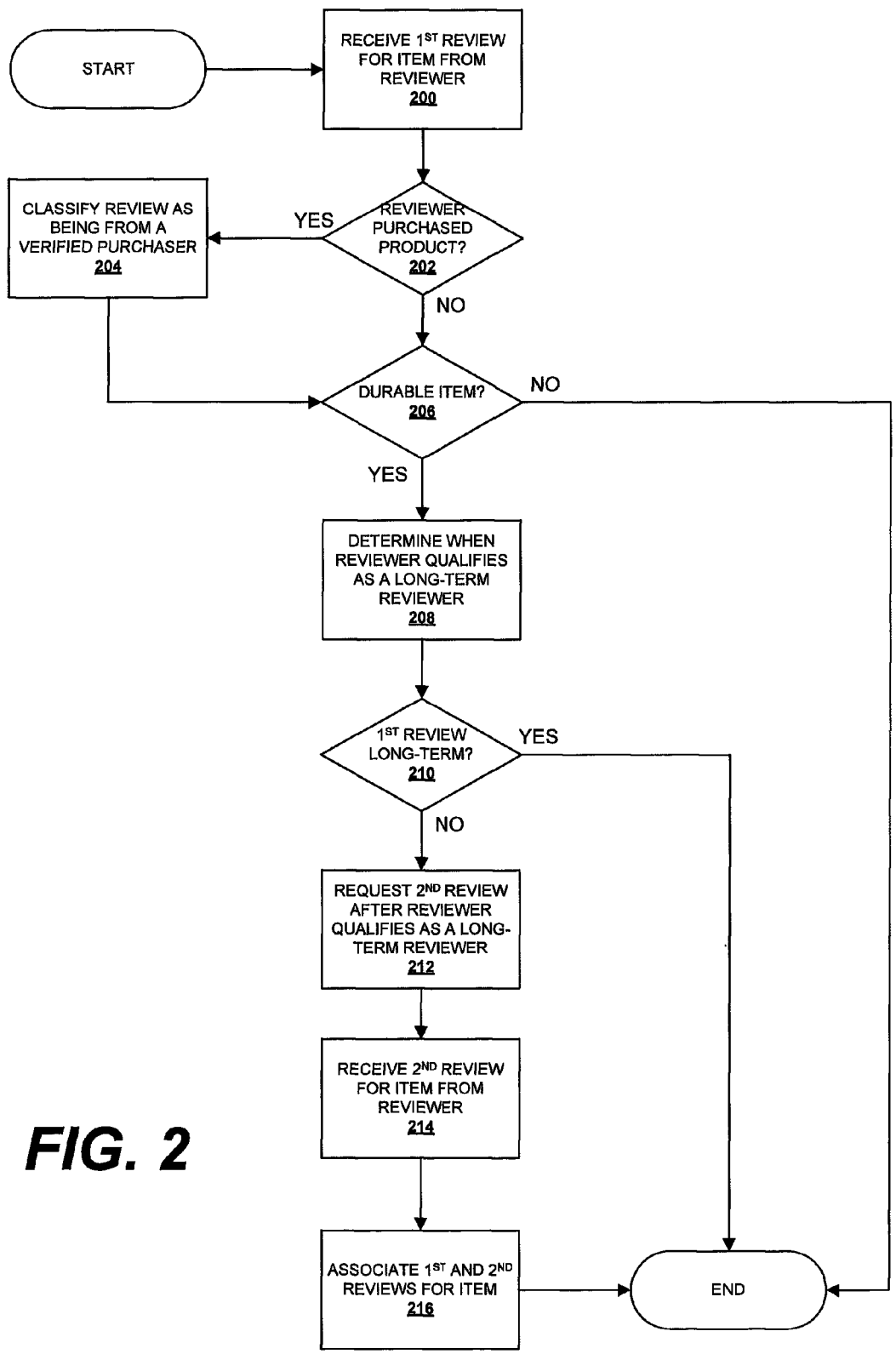
FIG. 2 is a flowchart of operations for collecting reviews for an item according to certain embodiments of the present disclosure.

As shown in FIG. 2, operations may begin (Block 200) with the receipt of a first review for an item which is received from a particular customer or other individual. Note that herein customers who submit reviews are also referred to as "reviewers." The individual submitting the review most typically is the individual who actually purchased the item being reviewed, but may alternatively be another individual who has used the item (e.g., an individual who received the item as a gift, borrowed the item, etc.). The first review may be submitted, for example, on a web site run by the online retailer by following the directions that are provided on the web site. Alternatively, if the review was submitted in response to a request for a review that was sent to the reviewer, the reviewer may provide the review via a reply to the request (e.g., by return e-mail or by clicking on or otherwise selecting a link in the review request which will link the reviewer to a form delivered over the Internet).

In response to receiving the first review for the item, a determination may be made as to whether or not the individual submitting the review purchased the product at issue (Block 202) and hence is a verified purchaser. This allows the review collector to distinguish reviews coming from a credible source, such as an item purchaser, rather than an anonymous or unverifiable source which may actually be the item manufacturer, author, a competitor or a prankster.

The verified purchaser determination at Block 202 may be made, for example, by comparing information that is submitted with the first review such as the name or e-mail address of the reviewer, a customer number associated with the reviewer, etc. to information stored in, for example, the order history database 156 and/or the customer database 154 to determine if the individual submitting the first review purchased the item at issue from the online retailer. If it is determined that the reviewer did in fact purchase the item at issue, the reviewer may be classified as a verified purchaser (Block 204). Additionally, the link in the review request may be to a unique URL associated with the customer. Thus, the online retailer may also be able to confirm that a review provided via such a link is an actual customer and a purchaser of the reviewed item. As another technique, if the customer visits the retailer's web site, the retailer can examine the order history stored in or in association with the customer's cookie using standard cookie techniques to verify that the customer had actually purchased the reviewed item. With such verified purchasers, the web pages (or other transmissions such as SMS text) that contain their reviews that are sent to reviewers may include an indicia such as a badge, text or the like that indicates that the online retailer has confirmed that the individual submitting the review had purchased the item at issue. The use of such verified purchaser badges allows other customers to give greater weight to the reviews that were submitted by actual purchasers, which are likely to be more credible than completely anonymous or unverified reviews. In some embodiments, only verified reviews may be provided to reviewers.

A determination may also be made as to whether or not the item for which the review was submitted comprises a durable item (Block 206). As discussed above, a durable item refers to a physical product that does not quickly wear out and has an expected lifespan of at least one year and/or to a service that lasts for at least one year. As shown in FIG. 2, if it is determined at Block 206 that the item at issue is not a durable item, then the operations for collecting reviews may end. However, if it is instead determined that the item at issue is a durable item, then operations may proceed to Block 208. It will be appreciated that while in the depicted embodiment items are classified as either durable items or non-durable items (i.e., every item will fall into one of two categories), in other embodiments the online retailer may choose to classify items that are offered for sale into more than two categories (a three category example might be consumable items, semi-durable items and durable items) and perform different review solicitation strategies for each of these different categories.

At Block 208, a determination is made as to when the reviewer will qualify as a long-term reviewer for the item at issue. As discussed above, in some embodiments, each item (or, in some cases, each durable item) may have a time period associated therewith which specifies how long a reviewer should have used or owned the product or used or subscribed to the service in order to be considered a long-term reviewer. This time period may be individually selected for each durable item (or alternatively, each of a plurality of categories of durable items such as electronics, housewares, etc. may have a common associated time period for the category), and is typically selected to be long enough to allow the reviewer to experience potential positive and/or negative attributes of the product or service that may not be apparent shortly after purchase. Such attributes may include, for example, product defects, missing features, ease of use with practice, or other advantages or disadvantages that become more apparent after extended use. The time period associated with the item at issue may then be compared to information regarding the length of time which the reviewer has owned or used the item to determine when the reviewer will qualify as a long-term reviewer. This information regarding how long the reviewer had owned or used the item may be obtained in a number of different ways including, for example, through direct input in the review (i.e., by filling in a field that asks how long the reviewer has owned used the product) or by comparison to a stored date when the item was delivered to the reviewer or the service was initiated (which is possible for verified purchasers), which date is used to calculate or estimate how long the reviewer has owned or used the item. In some cases, it may be possible for a merchant to determine or estimate usage information from their own records (e.g., for electronic book readers the retailer may have information on the number of books downloaded; in other situations the retailer may have records regarding how long the user has received a service).

Next, at Block 210, a determination may be made as to whether the first review was a long-term review (i.e., submitted after the date on which the reviewer qualifies as a long-term reviewer). If so, operations may terminate as, in some embodiments, a long-term review will not be requested from customers who have already provided a long-term review. While not depicted in FIG. 2, it will be appreciated that in other embodiments multiple long-term reviews may be requested (e.g., a first review after 2 years, a second review after 3 years, a third review after 10 years, etc.). If, on the other hand, at Block 210 it is determined that the first review was not a long-term review, then a second review may be requested from the reviewer once the reviewer qualifies as a long-term reviewer (Block 212). This second review may be requested, for example, via e-mail or other messaging techniques or may be presented to the reviewer when the reviewer next logs into a particular web site. The request for the second review may be sent to arrive specifically on nights, weekends or holidays, when people are more likely to have free time to provide such reviews. The request may be automatically generated. The request may specify, for example, the item for which the review is being sought, the date on which the item was purchased and, optionally, any rewards for completing a second review. Links may be provided to review guidelines and to sample reviews. The reviewer may be provided with a review form and/or instructions for providing the review via e-mail, and/or provided with a hyperlink to a URL where a review form is available.

In response to this request, a second customer review may thereafter be received from the reviewer (Block 214). The second review may be submitted by, for example, any of the techniques that are discussed above which may be used to submit the first review (e.g., e-mail, a form on the retailer's web site, SMS, IM, text messaging, etc.). This second review will comprise a long-term review since it was not requested until after the reviewer qualified as a long-term reviewer. Finally, at Block 216, the first and second reviews that were received from the reviewer are associated with each other as they comprise a short-term review and a long-term review that were received from the same individual for the same item. These associated reviews may provide an indication as to how the reviewer's opinion regarding the item varied over time.

Operations by which an online retailer or other entity can provide reviews for an item to individuals interested in reading such reviews according to certain embodiments of the present disclosure will now be described with reference to the flow chart of FIG. 3.

Figure 3:
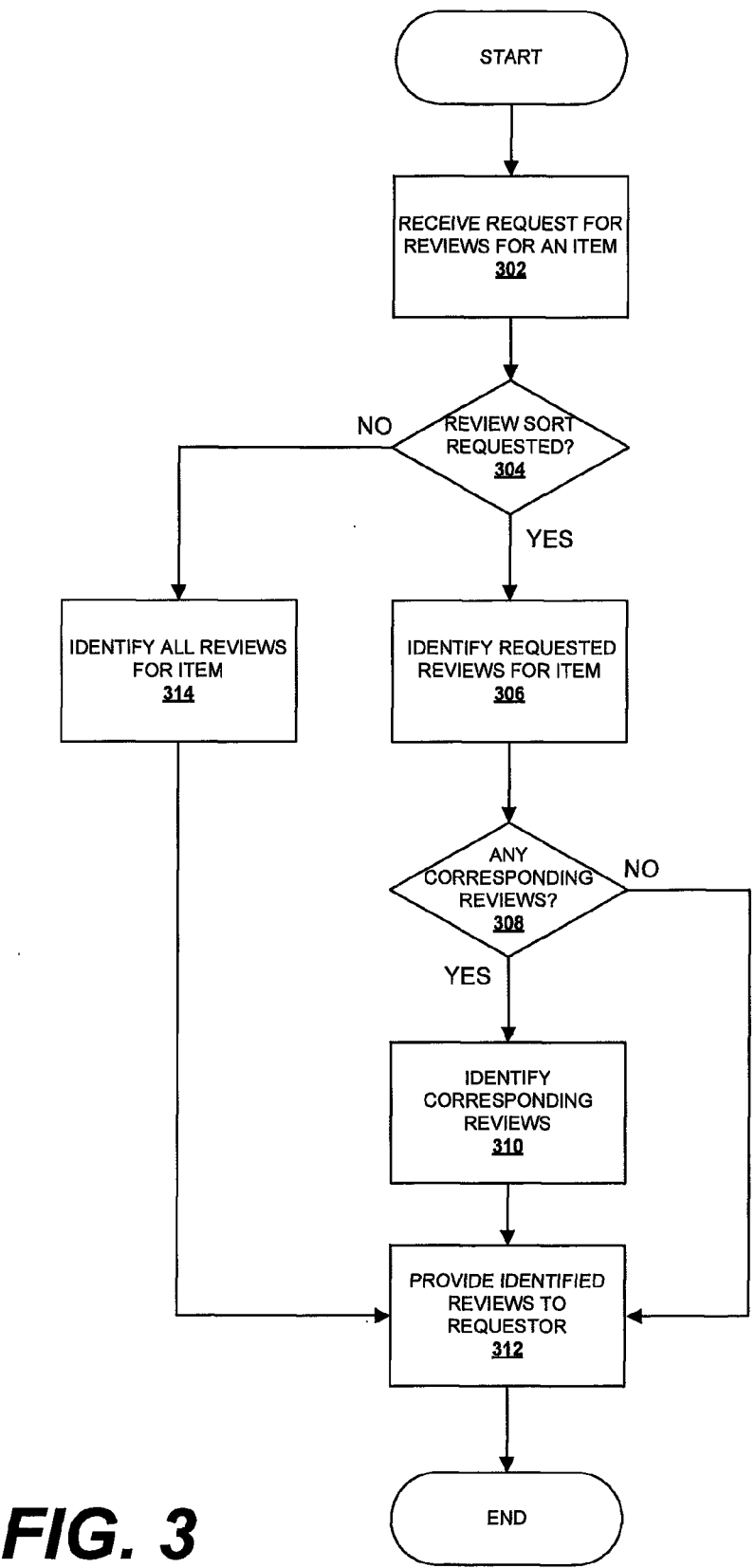
FIG. 3 is a flowchart of operations for providing reviews for an item according to certain embodiments of the present disclosure.

As shown in FIG. 3, operations may begin with the online retailer (or other entity) receiving a request for reviews for an item (Block 302). This request may be received, for example, in response to an individual visiting the online retailer's web site and clicking on a hyperlink to the reviews for a particular item. Reviewers could also request the reviews for an item in numerous other ways (e.g., from a drop-down menu). In some embodiments, the web page(s) that include the hyperlinks to the reviews may allow individuals using the web site to sort the reviews in certain ways. For example, in some embodiments, a plurality of hyperlinks may be provided, including hyperlinks that jump to (1) a listing of all reviews, (2) a listing of the short-term reviews for the item and (3) a listing for the long-term reviews for the item. It will also be appreciated that individuals using the web site may be provided additional or different methods of sorting the reviews (e.g., sorting the reviews by rankings, by different numbers of months that the reviewer used the product, etc.).

In embodiments where the web site includes such sorting options, a determination may next be made as to whether or not the individual requesting the reviews has requested that the reviews be sorted or filtered in some fashion (Block 304).

If such a sort or filtering has been requested, then the requested sub-category of reviews that have been requested are identified (Block 306). By way of example, if the individual requesting the reviews clicks on a hyperlink for the long-term reviews for the item, at Block 306 the reviews for the item are then filtered to identify only the long-term reviews. Next, a determination may be made as to whether there are any "corresponding" reviews for an item (Block 308). Here, two reviews are considered to be "corresponding" reviews if they were submitted by the same reviewer for the same item. In our example above where the individual only requested the long-term reviews for the item, the operations of Block 308 would include analyzing all of the reviews to determine if any of the individuals who submitted long-term reviews also submitted short-term review(s) for the item (or additional long-term reviews for the item). In the particular embodiment of FIG. 3, these corresponding reviews would also be identified (Block 310) even though they do not necessarily fall within the type of reviews (e.g., long-term reviews) that were requested at Block 304. Finally, all of the identified reviews may then be provided to the requestor (Block 312). As discussed below, corresponding pairs or sets of reviews (e.g., a short-term review and a long-term review that were submitted by the same reviewer) may be provided to the requestor so that they are displayed in a special manner that may facilitate providing the requestor information regarding how the opinions of various reviewers regarding the item at issue varied over time.

If at Block 304 it is instead determined that a sort of the reviews has not been requested, then all reviews for the item at issue may then identified (Block 314). Operations may then proceed to Block 312 where the identified reviews (here all of the reviews) are provided to the requestor.

Figure 4B:
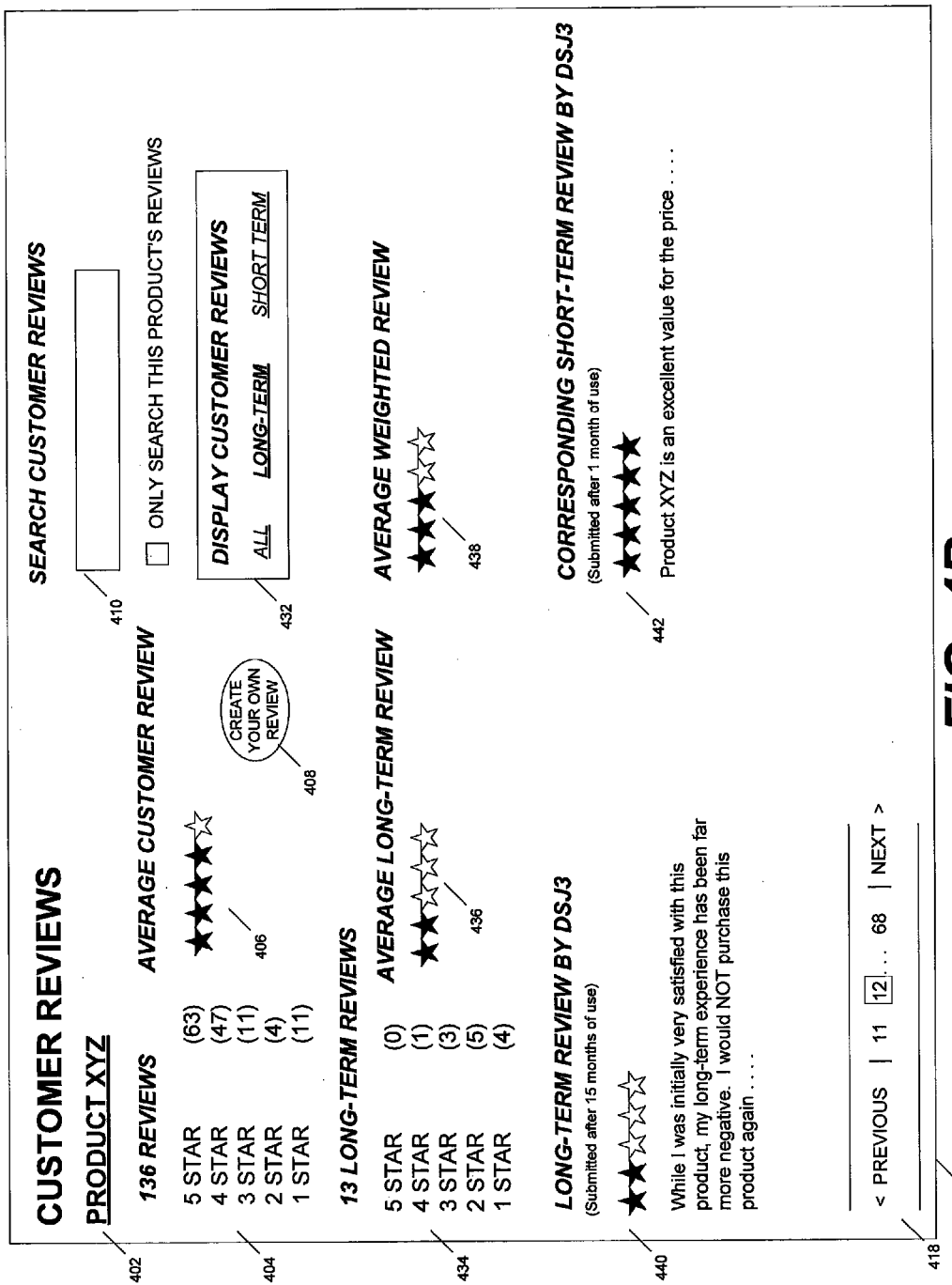
FIG. 4B is a schematic diagram illustrating a user interface that may be used to access reviews for an item according to embodiments of the present disclosure.
Figure 4C:
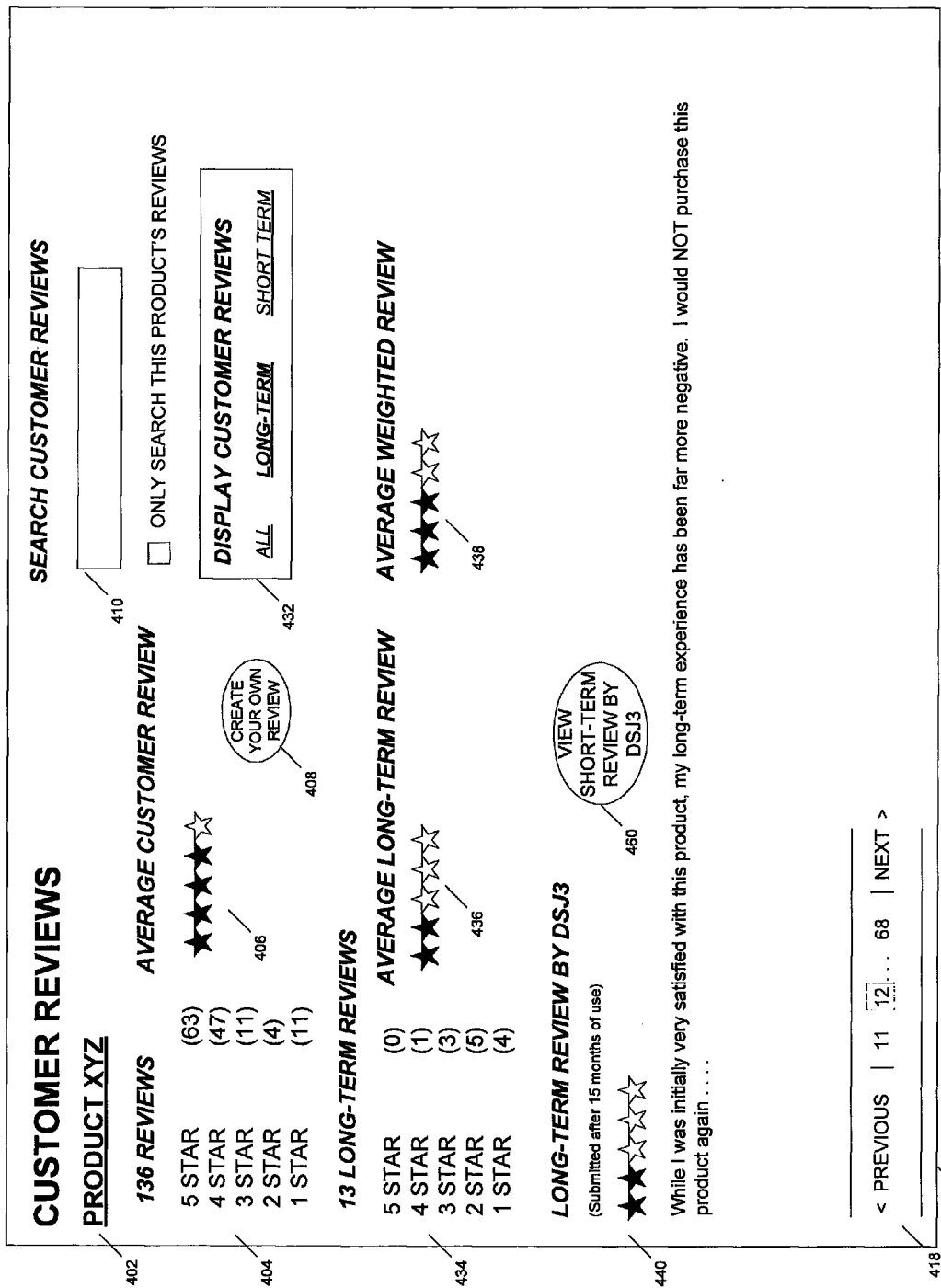
FIG. 4C is a schematic diagram illustrating a revised version of the user interface of FIG. 4B.
Figure 4D:
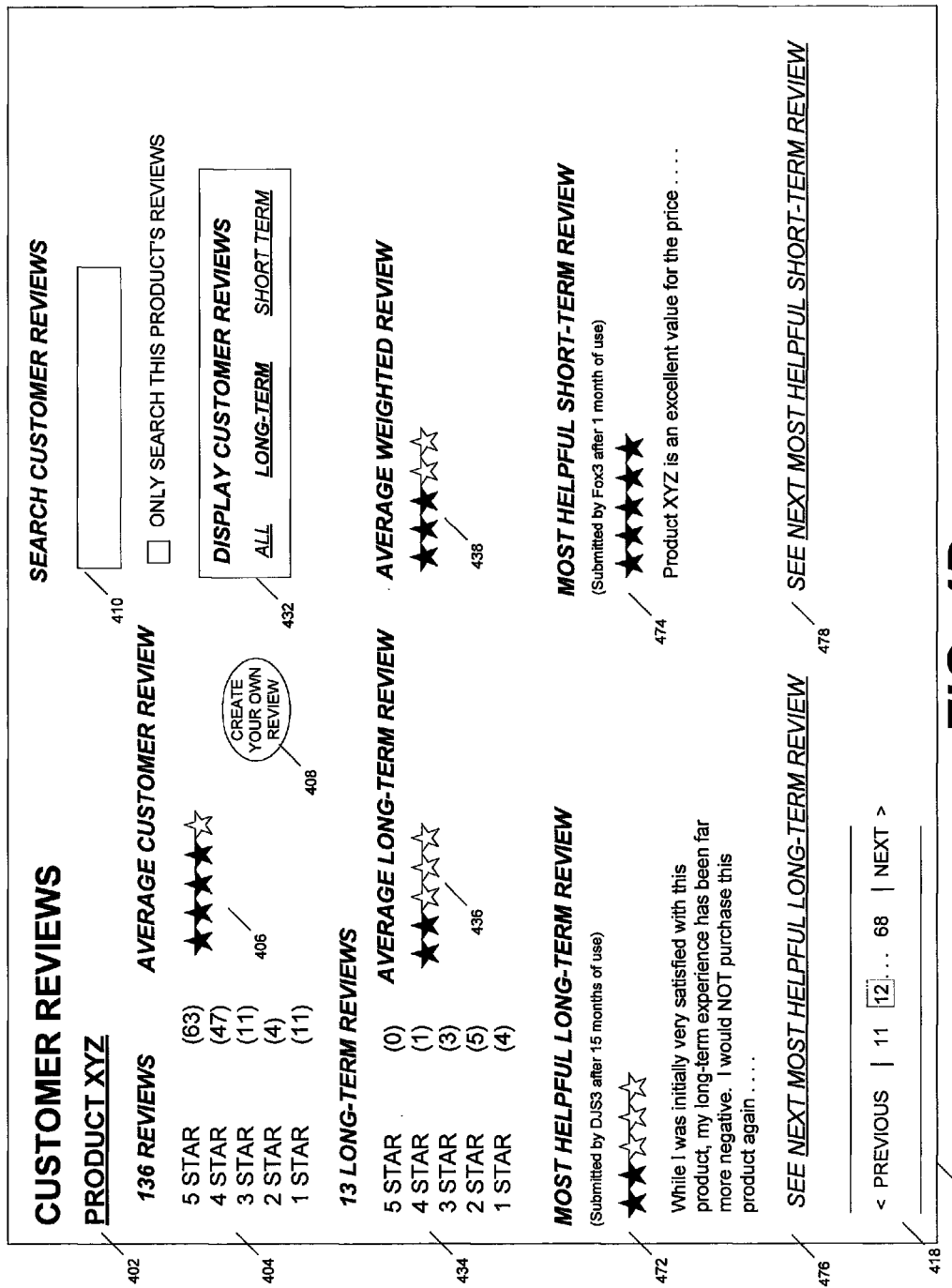
FIG. 4D is a schematic diagram illustrating another revised version of the user interface of FIG. 4B.

FIG. 4A is a schematic diagram illustrating a conventional user interface that may be used to access reviews for an item. FIGS. 4B-4D are schematic diagrams illustrating several user interfaces according to embodiments of the present disclosure that may be used to access reviews for an item.

As shown in FIG. 4A, the conventional customer review web page user interface 400 provides consumers a variety of information including identification of the product at issue 402, rankings for the reviews 404, information regarding the average ranking 406, and a button 408 which a viewer can use to create their own review for the item. The web page 400 also includes a dialog box 410 that a viewer can use to search the reviews, and viewing areas 412, 414 for displaying reviews that have been identified as being the most helpful favorable review and the most helpful critical review, respectively. The web page 400 also includes hyperlinks 416 which may be used to access additional reviews with different "star" rankings (also referred to as "point" ratings, which provide a reviewer a quick and simple way to provide a meaningful review for an item), a viewing area 422 in which a first group of the reviews is displayed, hyperlinks 418 that may be used to scroll through the reviews in viewing area 422, and hyperlinks 420 that may be used to select which reviews are displayed first in viewing area 422. In the depicted example the hyperlinks 418 show that the viewer has requested the reviews that have been designated the most helpful reviews be viewed first (as shown by the "Most Helpful First" hyperlink being bolded in FIG. 4A), and hence the viewing area 422 contains the first group of the most helpful reviews (only the first part of the first such review is visible in FIG. 4A; however, the user could scroll down to view the remaining favorable reviews in the first group).

As shown in FIG. 4A, using these conventional techniques a viewer may have to manually scroll through a large number of reviews in order to determine whether prior purchasers have been satisfied with the product after long-term use. While each individual review may be dated, this dating does not indicate how long the reviewer had used or owned the product at the time that the review was submitted. Moreover, even if web sites were to include information regarding how long the reviewer had owned the item at the time of the review, it would still be necessary to manually sift through a potentially very large number of reviews to find the reviews that were submitted after more extended periods of use. As the number of short-term reviews typically far exceeds the number of long-term reviews (as customers are far more likely to submit reviews shortly after making a purchase), it can be time-consuming to sift through all of the reviews. Moreover, it may also be difficult to determine if long-term reviews that differ significantly from the majority of short-term reviews are representative as to the opinions of a "typical" long-term reviewer, as typically customers that submit a second review do so by editing their original review. As such, information regarding how prior purchaser's opinions regarding a particular product have changed over time may not be available, much less readily apparent, from many conventional customer review collections. These short-comings can limit the usefulness of reviews and/or make it more difficult for prospective purchasers and others to quickly and easily use the information contained in the reviews.

Turning now to FIG. 4B, an exemplary web page 430 according to embodiments of the present disclosure is schematically illustrated that may be sent to individuals who request customer reviews. As shown in FIG. 4B, the web page 430 may again include an identification of the product at issue 402, rankings for the reviews 404, information regarding the average ranking 406, a button 408 which a viewer can use to create their own review for the item, and a dialog box 410 that a viewer can use to search the reviews. The web page 430 also includes hyperlinks 432 which a viewer can use to sort the reviews. In this particular embodiment, a viewer can choose to view all of the reviews, only the short-term reviews, or only the long-term reviews (in FIG. 4B, the view long-term review option has been selected).

The web page 430 further includes a set of rankings 434 for the long-term reviews and information regarding the average ranking for the long-term reviews 436. The web page also includes information regarding the "weighted" ranking for the reviews 438. As will be discussed in more detail herein, this weighted ranking may take into account differences in the number of short-term and long-term reviews in order to provide a composite ranking that may be more accurate than either the average ranking 406 or the average long-term review ranking 436. It will be appreciated that in some embodiments different subsets of the ranking information may alternatively be provided (e.g., only provide the weighted rankings; only provide the average ranking and the long-term review rankings; provide only an average ranking for short-term reviews and the average ranking for the long-term reviews, etc.).

The web page 430 also includes a viewing area 440 in which a first group of the selected reviews is displayed. In FIG. 4B, the first such review is a long-term review by DSJ3. The long-term review specifically identifies how long the reviewer had used (or owned) the item at issue at the time the review was submitted. While not shown in FIG. 4B, additional long-term reviews may be provided below this first long-term review, and a viewer may access these reviews by scrolling down their display. Hyperlinks 418 are also provided which may be used to change the reviews that are shown in the viewing area 440 (i.e., move to the next review; jump to a different review, etc.).

As is further shown in FIG. 4B, a second viewing area 442 is provided adjacent the viewing area 440. This second viewing area 442 may be used to display any short-term review that corresponds to the displayed long-term review (i.e., a short-term review for the item at issue that was submitted by the same individual who submitted the long-term review). The short-term review specifically identifies how long the reviewer had used (or, alternatively, owned) the item at issue at the time the review was submitted. By displaying the long-term review and its corresponding short-term review side-by-side, a viewer can quickly and easily see how prior customer's views of an item have changed after they have owned and/or used the item for a more extended period of time. While in the embodiment depicted in FIG. 4B the short-term and long-term reviews are displayed in side-by-side fashion, it will be appreciated that they alternatively could be displayed above-and-below each other, on other parts of the display (although shown simultaneously). In still other embodiments, the corresponding short-term review may not be displayed adjacent the long term review, but instead a hyperlink or other mechanism is provided that alerts a viewer that a corresponding short-term review exists, and provides the viewer a means for calling up that short-term review. FIG. 4C illustrates one implementation of such an embodiment of a web page 450 where a hyperlink 460 to a corresponding short-term review is positioned near the long-term review in lieu of providing the second viewing area 442 of FIG. 4B to display corresponding short-term reviews. The web page 450 of FIG. 4C is otherwise identical to the web page 430 of FIG. 4B and hence will not be described further herein.

FIG. 4D illustrates a web page 470 in which the most helpful long-term review is displayed in a viewing area 472 and the most helpful short-term review is displayed in a viewing area 474. Hyperlinks 476 and 478 are also provided that allow a user to scroll to the next most helpful long-term or short-term review, respectively. The user interface 470 of FIG. 4D provides another convenient method of providing prospective purchasers a way to quickly and easily see how opinions regarding the item at issue may change over time.

Figure 4E:
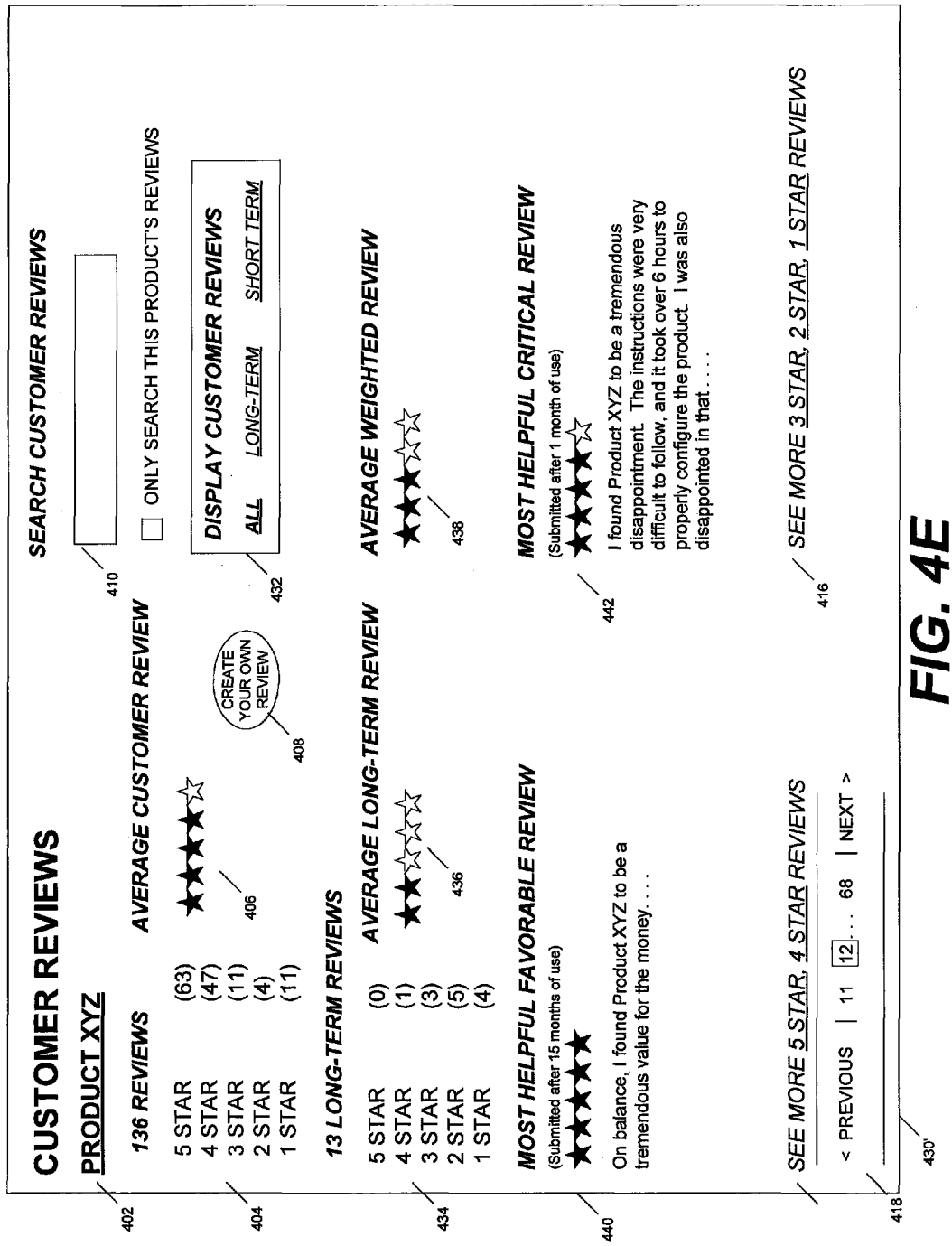
FIG. 4E is a schematic diagram illustrating the user interface of FIG. 4B where the user has selected to display all customer reviews.

FIG. 4E illustrates a web page 430' which may be generated when a viewer of the web page 430 of FIG. 4B uses the "all" hyperlink in viewing area 432 to select that all of the customer reviews be displayed instead of just the long-term reviews. As shown in FIG. 4E, in this embodiment, the web page 430' displays the most helpful favorable review and the most helpful critical reviews first, and does not distinguish between long-term and short-term reviews (although in this embodiment information is provided regarding how long each reviewer had used the product at the time that their respective reviews were submitted). The most helpful and most critical reviews may be either short-term or long-term reviews. While not shown in the figures, the viewer could alternatively use the "short-term" hyperlink in box 432 of FIG. 4B or FIG. 4E to view only the short-term reviews. When this option is selected, a web page (not shown) would be provided that would be identical to the web page 430 of FIG. 4B except that the short-term reviews would be displayed in viewing area 440 of FIG. 4B (as opposed to the long-term reviews) and any corresponding long-term reviews would be displayed in the viewing area 442 of FIG. 4B.

As discussed above with respect to FIG. 2, in some embodiments, customers may be encouraged to submit long-term reviews by tracking when a particular customer will qualify as a long-term reviewer for the item at issue, and at that point sending the customer a communication requesting that they submit a review of the item. By encouraging the submission of long-term reviews, online retailers and other merchants may be better able to gauge the long-term satisfaction levels of customers with respect to specific items, and may pass this information onto prospective purchasers (e.g., by making the long-term reviews available for viewing). As also discussed above, by encouraging customers to submit both a short-term review and a long-term review for each item and by then making this information available to viewers in a convenient fashion, it also is possible to provide viewers information regarding how customers opinions regarding the item have changed over time.

In order to further encourage the submission of long-term reviews, in some embodiments, a leader board may be created for the submission of long-term reviews, and badges may be provided for repeat long-term reviewers. "Badges" refer to symbols (e.g., an icon) that may be associated with customers or reviewers. By way of example, individuals who provide significant numbers of reviews may be awarded a badge that identifies the individual as a significant reviewer. This badge may be displayed alongside each review that individual posts on the web site. Leader boards may also be used to recognize the individuals that have posted the most reviews. By providing a long-term review leader board, it may be possible to encourage more individuals to provide such long-term reviews for the items that thy purchase. Top reviewers as reflected in the leader boards and/or by badges that have been awarded for the submission of a large number of reviews may be given special opportunities such as the opportunity to request products at reduced or no cost in exchange for providing reviews on that product or other rewards or incentives such as discount coupons, free shipping, gifts, rebates and the like.

In some embodiments, a reviewer who is submitting a long-term review for an item after previously submitting a short-term review for that item will be required to provide the long-term review as a separate review. This separate long-term review may be maintained as a separate and distinct review from the short-term review that the user submitted for the item. However, in other embodiments, the reviewer may be provided an option of either editing his short-term review or providing the separate long-term review. If the reviewer chooses to edit his or her initial review, the initial review and the edited version of the initial review may be maintained as separate and distinct reviews that are associated with each other. These associated reviews may then be displayed adjacent to each other and/or simultaneously when one of the two reviews is to be displayed to an individual who request the reviews for the item at issue.

As discussed above, FIGS. 2 and 3 illustrate, respectively, operations for collecting and providing reviews for an item according to certain embodiments of the present disclosure. It will be appreciated that the operations disclosed in FIGS. 2 and 3 can be combined to provide methods, systems and/or computer program products for both collecting and providing reviews. It will likewise be appreciated that various of the operations depicted in FIG. 2, FIG. 3 and/or the combination of FIGS. 2 and 3 may be omitted and/or modified to provide additional embodiments of collecting and/or providing reviews according to further embodiments of the present disclosure. FIGS. 5-8 are flow charts that illustrate several such modified series of operations. While FIGS. 5-8 provide several examples of other combinations of operations, it will also be appreciated that the present disclosure encompasses all of the different combinations of the operations depicted in FIGS. 2 and 3. It will also be appreciated that in FIGS. 2-3 and 5-8 various of the operations may be carried out in different orders than shown in the figures, and hence the particular order shown is only exemplary in nature.

Figure 5:
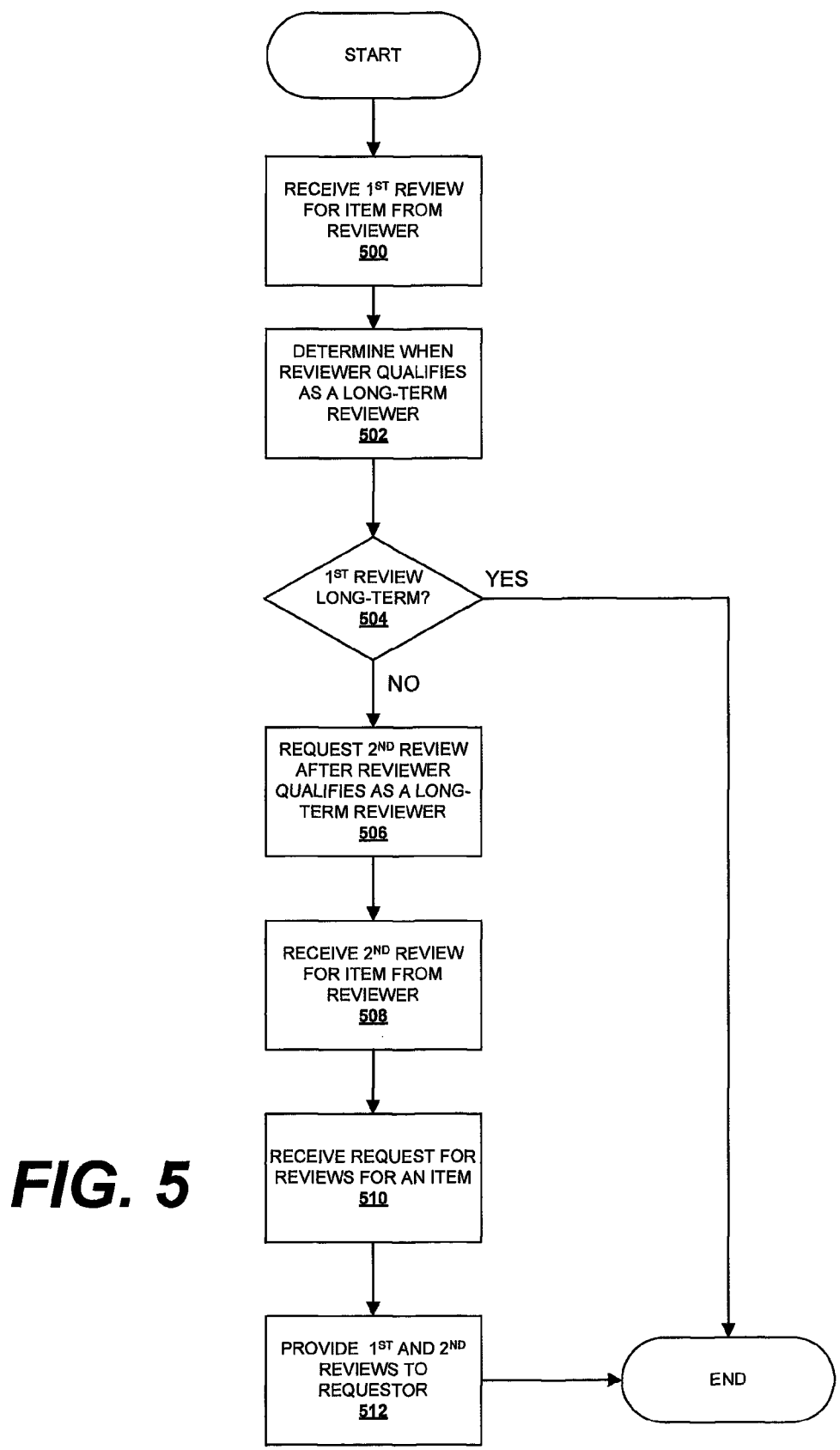
FIG. 5 is a flowchart of operations for providing reviews for an item according to further embodiments of the present disclosure.

Turning now to FIG. 5, operations for both collecting and providing reviews are disclosed therein. As shown in FIG. 5, operations may begin at Block 500 with the receipt of a first customer review for an item which is received from a particular customer. Next, a determination is made as to when the reviewer will qualify as a long-term reviewer for the item at issue (Block 502). As discussed above, in some embodiments, each item offered for sale or lease may have a time period associated therewith which specifies how long a reviewer should have used or owned the item in order to be considered a long-term reviewer. At Block 502, the time period associated with the item at issue may then be compared to an actual or estimated length of time which the reviewer has used or owned the item to determine when the reviewer will qualify as a long-term reviewer.

At Block 504, a determination may be made as to whether the first review was a long-term review (i.e., submitted after the date on which the reviewer qualifies as a long-term reviewer). If so, operations may end. If instead at Block 504 it is determined that the first review was not a long-term review, then a second review is requested from the reviewer at some point after the reviewer qualifies as a long-term reviewer (Block 506). In response to this request, a second review (which is a long-term review) may thereafter be received from the reviewer (Block 508). Thereafter, a request may be received from a prospective customer or other individual for the reviews for an item (Block 510). In response to this request, the first and second reviews may then be provided to the requestor (Block 512). As discussed above, in some (but not all) embodiments, the first and second reviews may be associated with each other as they comprise short-term and long-term reviews that have been provided by the same reviewer for the same item, and based on this association the first and second reviews may be provided to the requestor at Block 512 in such a way that they may be displayed to the requestor, for example, adjacent to each other and/or simultaneously.

Figure 6:
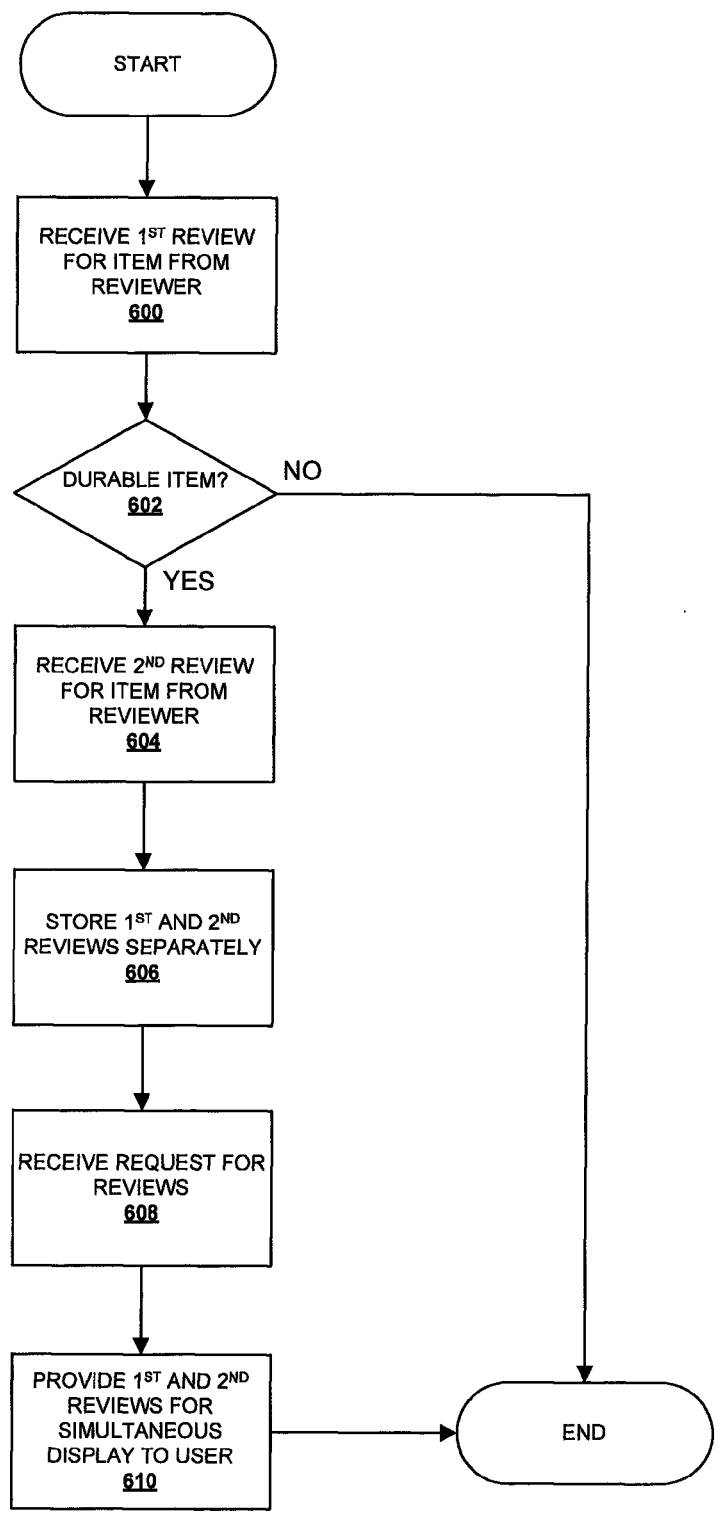
FIG. 6 is a flowchart of operations for providing reviews for an item according to yet additional embodiments of the present disclosure.

Turning now to FIG. 6, operations for both collecting and providing reviews according to further embodiments of the present disclosure are illustrated. As shown in FIG. 6, operations may begin at Block 600 with the receipt of a first customer review for an item which is received from a particular reviewer. Next, a determination is made as to whether or not the item for which the review was submitted comprises a durable item (Block 602). As shown in FIG. 6, if it is determined at Block 602 that the item at issue is not a durable item, then the operations may end. However, if it is instead determined that the item at issue is a durable item, then operations may proceed to Block 604 where a second review is thereafter received for the same item from the same reviewer. These first and second reviews are stored as separate and distinct reviews (Block 606). Thereafter, a request is received for some or all of the reviews for the item at issue (Block 608). In response to that request, the first and second reviews are provided to the requestor, and are forwarded to the requestor in a format that is configured to simultaneously display the first and second reviews to the requestor as separate and distinct reviews. In some embodiments, the first review may be a short-term review and the second review may be a long-term review, and the relationship between the reviews may be brought to the requestor's attention so that the requestor may use the first and second reviews to see how the reviewer's opinions regarding the item changed over time.

Figure 7:
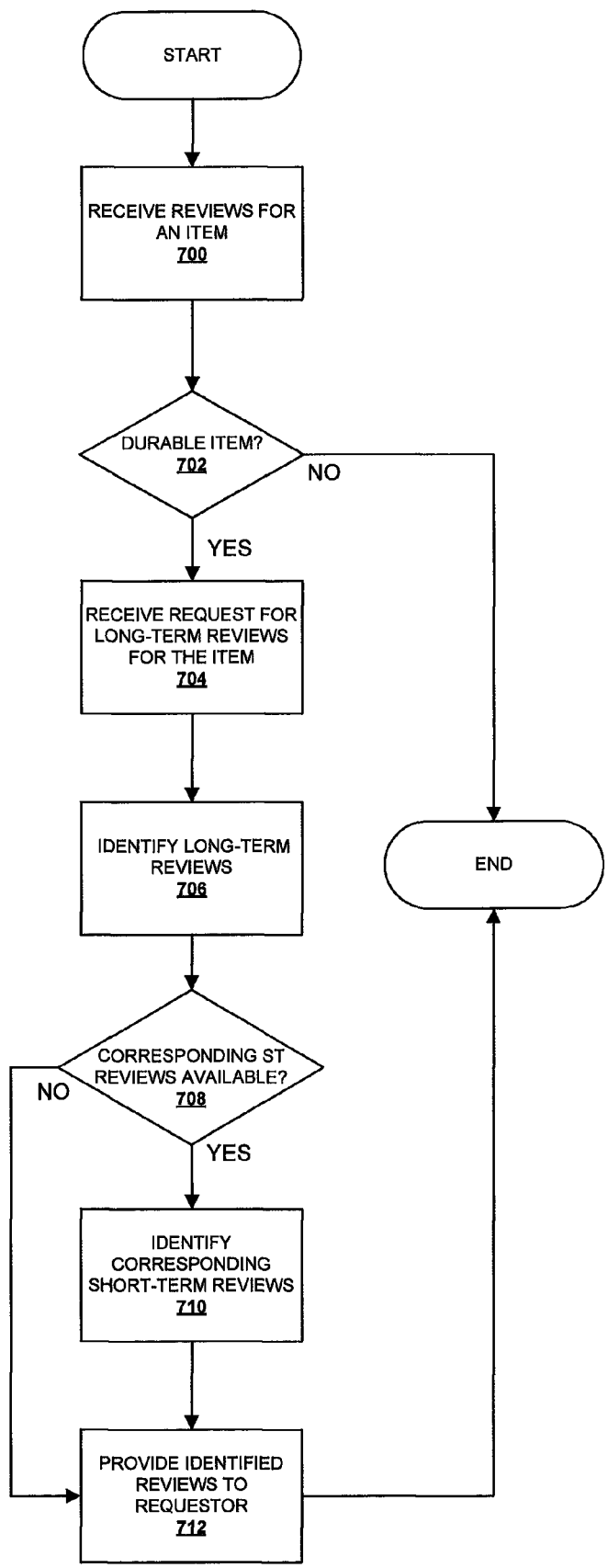
FIG. 7 is a flowchart of operations for providing reviews for an item according to still further embodiments of the present disclosure.

FIG. 7 illustrates operations for providing reviews according to further embodiments of the present disclosure. As shown in FIG. 7, operations may begin with the receipt of a plurality of reviews for a particular item (Block 700). In some embodiments, a determination may next be made as to whether or not the item at issue comprises a durable item (Block 702). (Note that the operation of Block 702 may be omitted in other embodiments.) As shown in FIG. 7, if it is determined at Block 702 that the item at issue is not a durable item, then the operations may end. However, if it is instead determined that the item at issue is a durable item, then operations may proceed to Block 704 where a request for the long-term reviews for the item at issue is received. In response to this request, the long-term reviews for the item are identified (Block 706).

Next, a determination is made as to whether any of the individuals who submitted long-term reviews for the item also submitted a corresponding short-term review for the item (Block 708). If so, these corresponding short-term reviews are identified (Block 710). Then, operations proceed Block 712 where the identified reviews are provided to the requestor. Thus, the operations of FIG. 7 provide a way of providing long-term reviews to a requestor along with any corresponding short-term reviews. The operations of FIG. 7 thus may be used, for example, to provide the long-term reviews and corresponding short term reviews illustrated on the web page 430 of FIG. 4B.

Figure 8:
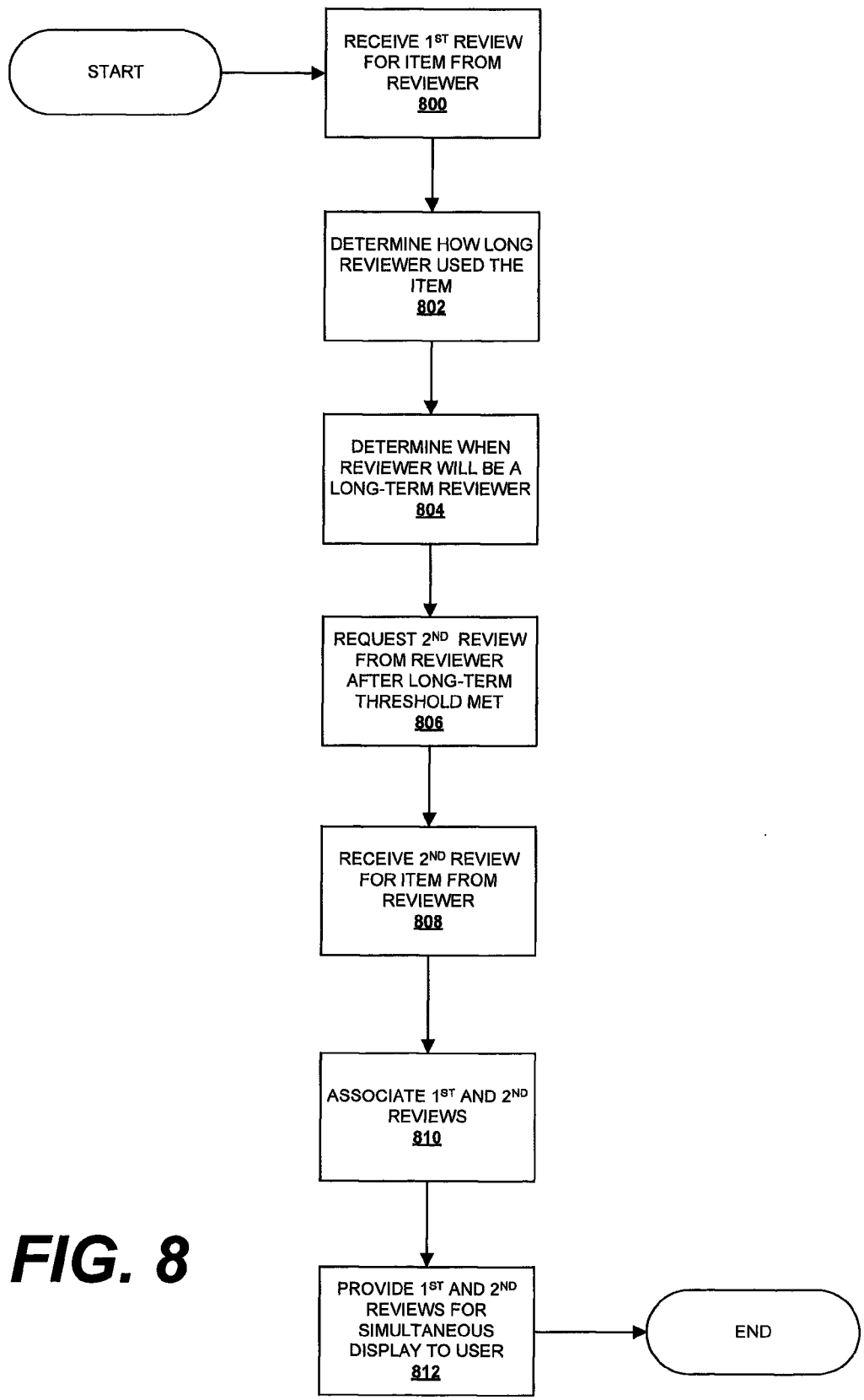
FIG. 8 is a flowchart of operations for collecting and providing reviews for an item according to still further embodiments of the present disclosure.

FIG. 8 illustrates operations for providing reviews according to further embodiments of the present disclosure. As shown in FIG. 8, operations may begin with the receipt of a first review for an item which is received from a particular reviewer (Block 800). In response to receiving this first review, a determination may be made as to an estimated or actual period of time for which the reviewer has owned or used the item (Block 802). This length of time may be estimated or determined, for example, based on a shipping or purchase date corresponding to when the reviewer purchased the product (if such information is available), through direct input by the reviewer on the review form, or through any other suitable method.

Next, a determination is made as to when the reviewer will qualify as a long-term reviewer for the item (Block 804). This time period may be determined, for example, by adding the time period that is required for the particular item at issue to comprise a long-term review to a purchase and/or first use date of the item by the reviewer. At some point after the time that the reviewer qualifies as a long-term reviewer for the item, a second review is requested from the reviewer (Block 806). In response to this request, a second, long-term, review may thereafter be received (Block 808). Then, the received first and second reviews for the item may be associated with each other as they comprise a short-term review and a long-term review that were received from the same individual for the same item (Block 810). These associated reviews may thereafter be provided to a user of the web site and may be displayed simultaneously so as to provide, for example, an indication as to how the reviewers opinion regarding the item varied over time.

As discussed above with respect to FIGS. 4A and 4B, reviewers are often asked to provide rankings for an item when submitting a review, such as the "star" rankings (i.e., a score of 1 star to 5 stars) depicted in FIGS. 4A-4D. These rankings may be provided for the product or service as a whole and, in some instance, there may be more than one ranking for each product (e.g., a ranking for value, a ranking for reliability, a ranking for ease of use, etc.). Typically, these rankings are then averaged to provide an average ranking for each item. This average ranking may provide prospective purchasers a quick and easy way to compare different items.

Pursuant to still further embodiments of the present disclosure, methods of calculating weighted review rankings are provided that may take into account the differences in the number of short-term reviews and long-term reviews to provide a weighted ranking for the reviews that may provide a more accurate snapshot of customer satisfaction with the item. This weighted ranking takes into account the fact that typically far more short-term reviews are provided for a particular item than long-term reviews. As a result, items that may operate well initially but exhibit degraded performance over time may generate overall high review scores, as the small number of negative long-term reviews may not significantly impact the large number of favorable short-term reviews.

Figure 9:
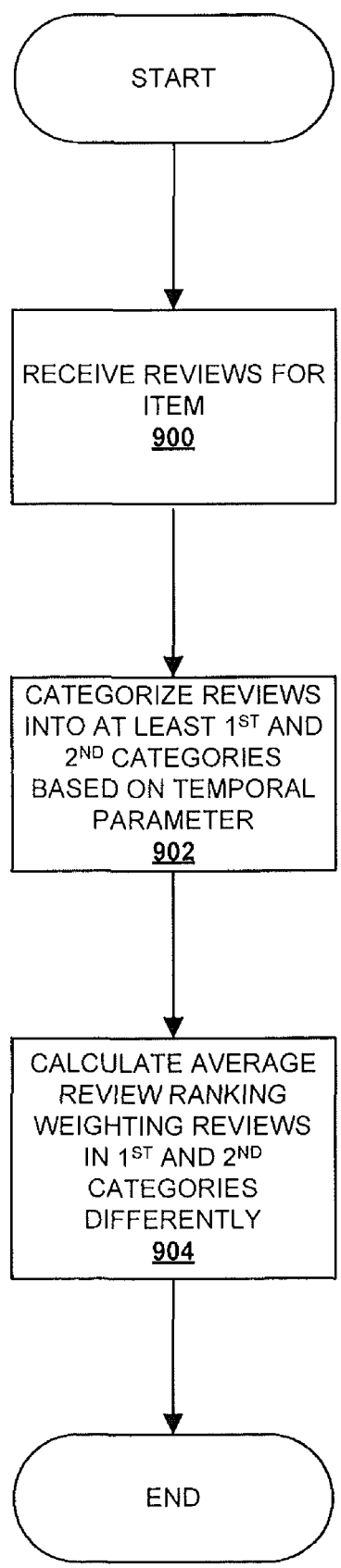
FIG. 9 is a flowchart of operations for summarizing reviews according to certain embodiments of the present disclosure.

FIG. 9 illustrates operations that may be used to calculate weighted rankings according to certain embodiments of the present disclosure. As shown in FIG. 9, operations may begin with the receipt of a plurality of reviews for an item (Block 900). The received reviews may contain reviews that were submitted after the reviewer had used the item for varying periods of time. Next, the reviews may be categorized into at least first and second categories based on a temporal parameter (Block 902). For example, the item at issue here may be a product where a review will be considered a long-term review if it is submitted after the reviewer has used or owned the product for at least three months at the time the review was submitted. In this situation, the plurality of reviews for the product might be grouped into a first category in which the reviewer had used the product for less than three months at the time the review was submitted (i.e., short-term reviews) and a second category in which the reviewer had used the product for three or more months at the time the review was submitted (i.e., long-term reviews). It will be appreciated that in further embodiments more than two temporally-based categories may be used.

Then, an average review ranking may be calculated, where the reviews in the first and second categories are weighted differently (Block 904). By way of example, in one embodiment, the total number of reviews in each category could be used to weight the reviews. For example, if there were five times as many reviews in the first category as in the second category, then each review in the second category could be weighted five times more heavily in calculating the weighted average review ranking for the item. It will be appreciated that numerous other weighting schemes could be used. This weighted review ranking may provide a more meaningful average ranking for the item as it may better take into account how reviewers' opinions regarding the product changed over time.

Figure 10:
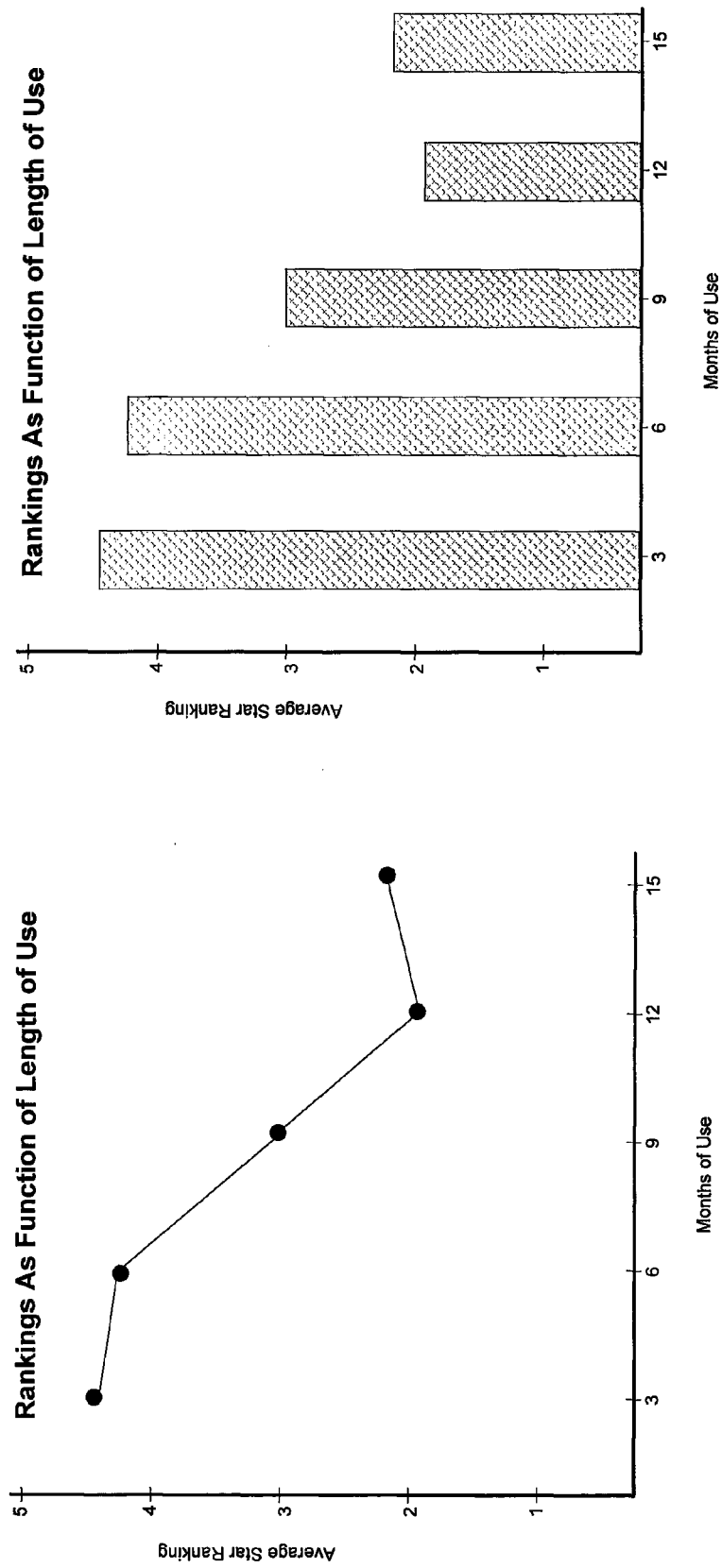
FIG. 10 illustrates two exemplary graphical displays showing how reviewer satisfaction with a product varies as a function of how long the product was used by the reviewer.

Pursuant to further embodiments of the present disclosure, information may also be provided to prospective purchasers that graphically depicts how an average rating varies as a function of the length of time that the reviewer had owned or used the item at issue at the time that the rating was submitted. As noted above, in some embodiments, rankings may be tracked based on various periods of time for which each reviewer has used a product or service at issue. As such, average rankings for each time period may thus be generated, and this information may be displayed graphically on, for example, the customer review web pages to provide an intuitive illustration of consumer satisfaction with the product as a function of the length of time the consumers had used the product. FIG. 10 provides two such exemplary graphical displays.

While various embodiments have been described above, it will be appreciated that the disclosed embodiments are not intended to be limiting, and are only provided by way of example, and that the present application is to cover all modifications, equivalents, and alternatives falling within the spirit and scope of the claims appended hereto.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, steps, operations, elements, and/or components, but do not preclude the presence or addition of one or more other features, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments according to the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and/or blocks may be omitted in some circumstances.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A computer-implemented method of providing a plurality of reviews for an item, the method comprising:
   electronically receiving a first review for the item from a reviewer over a communications network, wherein the first review comprises a short-term review that is generated before a predefined threshold time since receiving the first review;
   using a computer to determine when the reviewer will be a long-term reviewer for the item according to the predefined threshold time since receiving the first review;
   using the computer to electronically request a second review for the item after the reviewer is a long-term reviewer for the item, wherein the second review comprises a long-term review generated after the predefined threshold time;
   electronically receiving the second review for the item from the reviewer;
   electronically receiving a request to view the reviews for the item; and
   electronically providing both the first and second reviews in response to the request.

2. The method of claim 1, wherein the first and second reviews are maintained as separate and distinct reviews.

3. The method of claim 2, wherein electronically providing both the first and second reviews in response to the request comprises providing the first and second reviews in a format that is configured to display the first and second reviews adjacent to each other.

4. The method of claim 2, wherein electronically providing both the first and second reviews in response to the request comprises providing the first and second reviews in a format that is configured to display the first and second reviews simultaneously to a requestor of the reviews.

5. The method of claim 2, wherein the second review provides comments on information in the first review.

6. The method of claim 2, wherein the second review provides at least one different rating than was included in the first review.

7. The method of claim 2, further comprising determining if the item is a durable item prior to electronically requesting the second review for the item.

8. The method of claim 2, wherein the first and second reviews are two of a group of reviews, and wherein the method further comprises identifying at least a one of the group of reviews that is the long-term review.

9. A computer program product for providing reviews, the computer program product comprising a computer-readable medium having executable computer-readable program code therein, the computer-readable program code being configured to implement the method of claim 1.

10. A system for collecting feedback regarding an item, comprising:
    a receiver that is configured to electronically receive a first review for the item from a reviewer, wherein the first review comprises a short-term review generated before a predefined threshold time;
    a processor that is operatively coupled to the receiver, wherein the processor is configured to determine when the reviewer will be a long-term reviewer for the item according to the predefined threshold time since receiving the first review; and
    a transmitter that is configured to electronically transmit a request for a second review from the reviewer after the reviewer is a long-term reviewer for the item, wherein the second review comprises a long-term review generated after the predefined threshold time.

11. The system of claim 10, wherein the item comprises a product, and wherein the processor is further configured to determine if the product is a durable product.

12. The system of claim 11, further comprising a memory that is operatively associated with the processor, and that is configured to store the second review separately from the first review,
    wherein the receiver is further configured to electronically receive the second review from the reviewer; and
    wherein the processor is further configured to associate the first review and the second review.

13. The system of claim 12, wherein the system provides both the first and second reviews to a requestor in a format that is configured to simultaneously display the first and second reviews to the requestor.

14. A method of providing reviews to a user, the method comprising:

electronically receiving over a network a first review of an item from a first reviewer, wherein the first review comprises a short-term review received before a predefined threshold time;

after receiving the first review, electronically receiving a second review for the item from the first reviewer, where the second review is maintained as a separate review that is distinct from the first review, wherein the second review comprises a long-term review received after the predefined threshold time; and using a computer to electronically provide both the first and second reviews to the user in a format that is configured to simultaneously display the first and second reviews to the user as separate reviews.

15. The method of claim 14, wherein the item comprises a product, the method further comprising determining if the product is a durable product prior to electronically providing both the first and second reviews to the user.

16. The method of claim 14, the method further comprising:

receiving a request from the user for at least a one of a plurality of reviews for the item that is the long-term review;

using the computer to identify the ones of the plurality of reviews for the item are long-term reviews; and using the computer to electronically provide the long-term reviews to the user.

17. A computer program product for providing reviews to the user, the computer program product comprising a computer-readable medium having executable computer-readable program code therein, the computer-readable program code being configured to implement the method of claim 14.

18. A system for providing reviews, comprising:

a memory system that includes a plurality of reviews for an item stored therein;

a receiver that is configured to receive a selection from a user to view at least one of the plurality of reviews;

a processor that is configured to determine if a reviewer that provided the selection provided any other ones of the plurality of reviews for the item, wherein at least a first one of the reviews comprises a short-term review that has existed for less than a predefined threshold time and at least a second one of the reviews comprises a long-term review that has existed for more than the predefined threshold time; and a transmitter that is configured to transmit to the user the selection and other ones of the reviews for the item that were provided by the reviewer in a form such that the selected review and other ones of the plurality of reviews for the item that were provided by the reviewer are displayed to the user adjacent to each other.

19. A method of providing reviews for an item, the method comprising:

electronically receiving a plurality of reviews for the item;

using a computer to identify at least one of the plurality of reviews for the item that is a long-term review, the long-term review comprising respective ones of the reviews that are generated after at least a predefined threshold time;

using a computer to identify whether at least one of the reviews for the item is a short-term review, the short-term review comprising respective ones of the reviews that are generated before the predefined threshold time;

electronically receiving a request for the long-term reviews for the item; and electronically providing at least some of the long-term reviews for the item over a network in response to the request.

20. The method of claim 19, further comprising associating a first of the reviews for the item that was identified as the long-term review with a second of the reviews for the item that is the short-term review, wherein the first and second of the reviews were received from a same reviewer.

21. The method of claim 20, further comprising providing both the first and second of the reviews to a user in a format that is configured to simultaneously display both the first and second of the reviews.

22. The method of claim 20, further comprising transmitting a web page to a user that is configured to display the first and second of the reviews adjacent to each other.

23. The method of claim 19, further comprising determining if the item comprises a durable item based at least in part on a predefined threshold time prior to filtering the plurality of reviews for the item to identify the ones of the reviews for the item that are a long-term review.

24. A computer-implemented method of summarizing feedback regarding a product, the method comprising:

electronically receiving a plurality of reviews for the product from a plurality of reviewers over a network;

for each one of the reviews, determining an approximate length of time that a respective one of the reviewers used the product;

categorizing the reviews into at least a first review category and a second review category, wherein the first and second review categories are based at least in part on the determined approximate lengths of time that the respective reviewers had used the product at a time the respective reviews were received relative to a predefined threshold time, wherein the approximate length of time associated with the first review category comprises a short-term length of time occurring before the predefined threshold time and the approximate length of time associated with the second review category comprises a long-term length of time occurring at least at the predefined threshold time; and calculating an average review score for the product based on the reviews, wherein the reviews in the first review category are weighted differently than the reviews in the second review category in calculating the average review score.

25. The method of claim 24, wherein the first review category comprises the reviews that were received after the respective reviewers had used the product for less than a first amount of time and the second review category comprises the reviews that were received after the respective reviewers had used the product for at least the first amount of time, wherein the reviews in the second review category are weighted more heavily than the reviews in the first review category in calculating the average review score.

26. The method of claim 24, wherein a number of the reviews in each of the first and second review categories affects how the reviews are weighted in calculating the average review score.

27. The method of claim 24, further comprising generating a graphic display illustrating how the average review score has varied as a function of time.

* * * * *